United States Patent
El-Batal et al.

(10) Patent No.: US 7,260,417 B2
(45) Date of Patent: Aug. 21, 2007

(54) WIRELESS STORAGE ENTERPRISE CONNECTIVITY

(75) Inventors: Mohamad H. El-Batal, Westminster, CO (US); Thomas E. Richardson, Golden, CO (US); Zahirudeen Premji, Boulder, CO (US)

(73) Assignee: LSI Corporation, Milpitas, CA (US)

( * ) Notice: Subject to any disclaimer, the term of this patent is extended or adjusted under 35 U.S.C. 154(b) by 108 days.

(21) Appl. No.: 10/838,725

(22) Filed: May 4, 2004

(65) Prior Publication Data

US 2005/0250533 A1    Nov. 10, 2005

(51) Int. Cl.
*H04M 1/00* (2006.01)
*H02J 7/14* (2006.01)

(52) U.S. Cl. .................................. 455/552.1; 320/104

(58) Field of Classification Search ............. 455/552.1, 455/41.1, 557, 572, 502, 66.1, 41.2, 514, 455/412.1, 522; 710/58; 709/249; 711/114; 235/492; 340/988; 725/131; 320/104
See application file for complete search history.

(56) References Cited

U.S. PATENT DOCUMENTS

| | | | | |
|---|---|---|---|---|
| 5,841,122 | A * | 11/1998 | Kirchhoff | 235/492 |
| 6,424,820 | B1 * | 7/2002 | Burdick et al. | 455/41.1 |
| 6,427,065 | B1 * | 7/2002 | Suga et al. | 455/41.1 |
| 6,696,982 | B2 * | 2/2004 | Yoshioka et al. | 340/988 |
| 6,895,467 | B2 * | 5/2005 | Lubbers et al. | 711/114 |
| 6,954,616 | B2 | 10/2005 | Liang et al. | |
| 2003/0110512 | A1 * | 6/2003 | Maari | 725/131 |
| 2003/0157974 | A1 * | 8/2003 | Lin | 455/572 |
| 2003/0161411 | A1 | 8/2003 | McCorkle et al. | |
| 2003/0181229 | A1 | 9/2003 | Forster et al. | |
| 2003/0228005 | A1 | 12/2003 | Melick et al. | |
| 2004/0023683 | A1 | 2/2004 | Mizuhiki et al. | |
| 2004/0068591 | A1 * | 4/2004 | Workman et al. | 710/58 |
| 2004/0077313 | A1 * | 4/2004 | Oba et al. | 455/41.2 |
| 2004/0127254 | A1 * | 7/2004 | Chang | 455/557 |
| 2004/0203362 | A1 * | 10/2004 | Pattabiraman et al. | 455/41.2 |
| 2004/0224638 | A1 * | 11/2004 | Fadell et al. | 455/66.1 |
| 2004/0242250 | A1 * | 12/2004 | Sasai et al. | 455/502 |
| 2004/0259499 | A1 | 12/2004 | Oba et al. | |
| 2005/0021869 | A1 * | 1/2005 | Aultman et al. | 709/249 |
| 2005/0080895 | A1 | 4/2005 | Cook et al. | |

* cited by examiner

*Primary Examiner*—Joseph Feild
*Assistant Examiner*—Kiet Doan
(74) *Attorney, Agent, or Firm*—Duft, Bornsen, & Eishman

(57) ABSTRACT

A storage enterprise comprising multiple storage enterprise components coupled to exchange signals via respective wireless interfaces. The signals exchanged may include power signals and/or information signals. Power signals may be exchanged by an inductive coupling (wireless) between a first component and a second component. Information signals may include command/status and data signals exchanged between a first component and a second component. Any of several hierarchies of the connections in a storage enterprise may utilize such wireless connections. Exemplary wireless connection may include: storage controller to storage device or storage enclosure, storage enclosure to storage device, SAN appliance to storage device or storage enclosure or storage controller, computing node to storage device or storage enclosure or storage controller or SAN appliance.

14 Claims, 3 Drawing Sheets

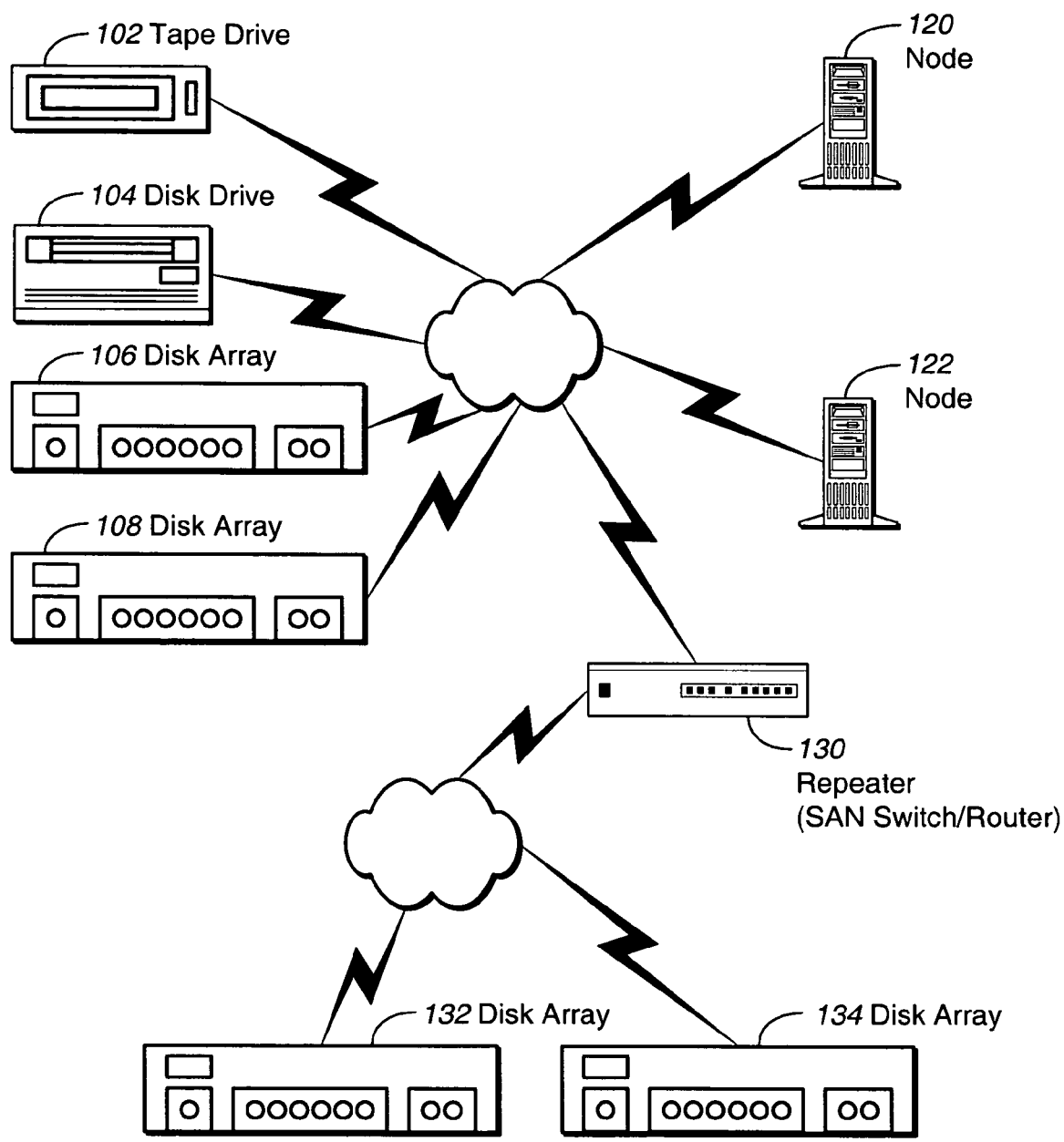
FIG._1

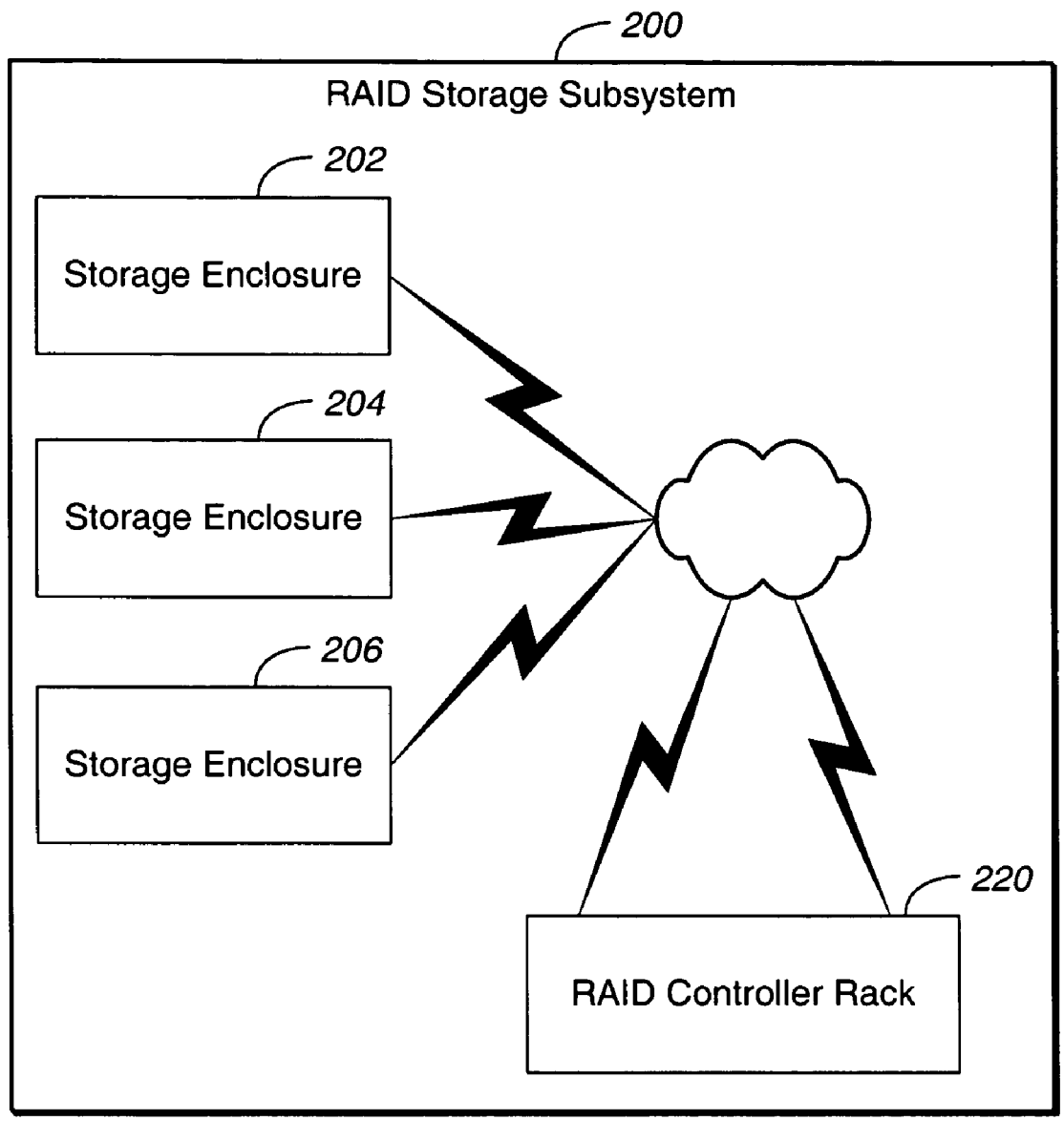
FIG._2

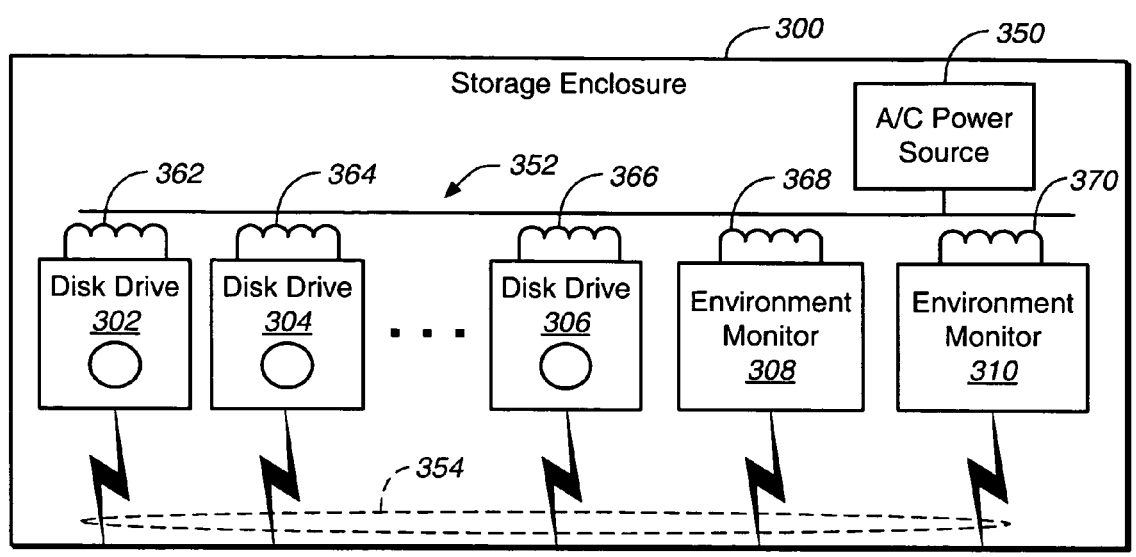
FIG._3

WIRELESS STORAGE ENTERPRISE CONNECTIVITY

RELATED PATENTS

This patent is related to commonly owned patent application Ser. No. 10/838,726 filed 4 May 2004 (herewith) and entitled WIRELESS STORAGE DEVICE CONNECTIVITY which is hereby incorporated by reference.

BACKGROUND OF THE INVENTION

1. Field of the Invention

The invention relates generally to storage enterprise interconnections and more specifically relates to structures to provide a wireless connection between components and subsystems of an enterprise storage architecture 2. Discussion of Related Art It is generally known in the computing arts that large computing storage enterprises utilize a number of storage related components interconnected with one another and connected to related workstations and server computing nodes. The various connections have traditionally utilized various electrical wired connections and/or optical cable connections. Exemplary of such hard-wired or cabled connections are power connections to supply power from a first component to a second component and information signal cables/wires for exchanging command, status and data signals between a first component and a second component.

In large computing/data enterprises, storage components may include individual storage devices, collections of storage devices housed within a common storage enclosure, collections of storage enclosures aggregated into a storage subsystem, storage controllers, collections of storage controllers operating cooperatively with regard to a storage devices or storage enclosures, power supplies for powering other components, environmental components to sense and control the ambient environment (such as cooling devices and temperature sensors), etc. Examples of individual storage devices may include magnetic or optical disk drives, magnetic or optical tape drives, and other semiconductor-based, volatile, and nonvolatile memory components (such as flash memory devices or so-called "RAM-disks"). Collections of these storage devices may be physically housed with a storage enclosure. Where the storage devices are disk drives, such enclosures containing multiple disk drives are often referred to as just a box of disks (or "JBOD"). Examples of devices for controlling other devices may include a host computing system such as a workstation or a server computing node, a host adapter within such a host system, a storage subsystem, a storage controller within such a storage subsystem, storage networking devices and components (i.e., storage area networks or SAN devices such as switches and routers), or any other device coupled to the storage devices or to storage enclosures.

Typically, the signals exchanged include power signals to provide electrical power for operating storage components and information signals (command, status and data signals) used for controlling operation of the storage components and for exchanging data to be stored in and read from the storage components. Typically, an electrical power wiring harness provides a hard-wired connection to apply power signals from an external source or device to the storage component for purposes of supplying power to the storage devices and enclosures. Most frequently, the electrical power signals so applied are direct current ("DC") electrical power signals including one or more DC voltage levels used for operating the storage devices and enclosures. In addition, a second signal cable is typically used for exchanging information signals between an external device and the storage devices and enclosures. This second interface cable may utilize any of several well-known interface signal media and protocol standards including, for example, IDE, SCSI, Fibre Channel, serial attached SCSI ("SAS") and serial AT attachment ("SATA") signaling standards. Those of ordinary skill in the art will recognize a wide variety of other well known signaling media and protocols used for exchanging information signals and power signals between storage devices and external device used to control the storage devices and enclosures.

In a simple, single computing node, hard-wire power and information cable harnesses between the external device (i.e., internal to the computing system but external to the storage device) and the storage device provide a relatively simple, inexpensive design that is easily manipulated by a human user or technician. A first cable harness may be used for providing power to one or more storage devices within such a simple, computing node and a separate cable harness may typically be used for coupling information signals within such a host system. However, in larger, more complex storage subsystems that may include tens, hundreds or even thousands of storage devices within one or more storage enclosures, coupled to one or more computing host systems via one or more redundant paths, such hard-wired cable interface techniques are both complex and costly. Complex wiring harnesses and backplanes for exchange of signals are typically utilized and impose a significant cost in the overall storage subsystem. Distribution of such power and information signals within complex storage enterprises therefore presents problems in complexity and cost. Although serial attach standards including optical serial attachments somewhat simplify these issues. However, even simplified serial attach cabling remain costly and complex where tens, hundreds or even thousands of storage devices are provided housed within multiple storage enclosures and coupled to multiple host systems and/or storage network components.

It is evident from the above discussion that an ongoing problem persists in simplifying and reducing cost associated with distributing power and information signals between various storage enterprise components in large complex computing and storage enterprises.

SUMMARY OF THE INVENTION

The present invention solves the above and other problems, thereby advancing the state of the useful arts, by providing structures for wireless connectivity of components in a storage enterprise. In one aspect, computing nodes may couple to storage devices and storage systems (all generally referred to herein as storage components or storage enterprise components) using wireless interfaces. Other aspects provide that storage devices and control/sensing devices housed within a storage enclosure may couple to power components and storage controller components using wireless interfacing techniques. Wireless interfacing may be applied to exchange of information signals (command, status and data signals) between components of the storage enterprise. Further, inductive coupling (i.e., wireless) may be used to exchange power signals between components of a storage enterprise. These wireless interface structures may be applied at any level of interface between components of a storage enterprise including, between computing nodes and storage subsystems, within a storage subsystem between storage enclosures and associated storage controllers, within a storage enclosure between devices within the enclosure, etc.

One feature hereof therefore provides a storage enterprise comprising: a first storage enterprise component including a first wireless interface; and a second storage enterprise component including a second wireless interface wherein said first storage enterprise component and said second storage enterprise component exchange signals via said first wireless interface and said second wireless interface, respectively.

Another aspect hereof further provides that the exchanged signals are power signals such that the first storage enterprise component supplies power to the second storage enterprise component via the first wireless interface and the second wireless interface, respectively.

Another aspect hereof further provides that information signals are exchanged between said first storage enterprise component and said second storage enterprise component via said first wireless interface and said second wireless interface, respectively.

Another aspect hereof further provides the first storage enterprise component further comprises a storage controller, and that the second storage enterprise component further comprises a storage device.

Another aspect hereof further provides that the first storage enterprise component further comprises a storage controller, and that the second storage enterprise component further comprises a storage enclosure.

Another aspect hereof further provides that the first storage enterprise component further comprises a storage enclosure, and that the second storage enterprise component further comprises a storage device.

Another aspect hereof further provides that the first storage enterprise component further comprises a storage area network appliance, and that the second storage enterprise component further comprises a storage enclosure.

Another aspect hereof further provides that the first storage enterprise component further comprises a storage area network appliance, and that the second storage enterprise component further comprises a storage device.

Another aspect hereof further provides that the said first storage enterprise component further comprises a computing node, and that the second storage enterprise component further comprises a storage enclosure.

Another aspect hereof further provides that the first storage enterprise component further comprises a computing node, and that the second storage enterprise component further comprises a storage device.

Another aspect hereof further provides that the first storage enterprise component further comprises a computing node, and that the second storage enterprise component further comprises a storage subsystem including multiple storage devices and one or more storage controllers.

Another feature hereof provides a system comprising: a computing system having a wireless interface; and a storage subsystem having a wireless interface, such that the computing system exchanges information signals with said storage subsystem using the wireless interfaces in the computing system and in the storage subsystem.

Another aspect hereof further provides a network appliance intermediate the computing system and the storage subsystem, the network appliance further comprising: a first wireless interface wirelessly coupled to the wireless interface of the computing system; and a second wireless interface wirelessly coupled to the wireless interface of the storage subsystem, such that the network appliance serves as a repeater to forward information signals between the computing system and the storage subsystem.

Another aspect hereof further provides that 14, the storage subsystem further comprises: a storage controller having a wireless interface; and a storage enclosure having a wireless interface, such that the storage controller exchanges information signals with said storage enclosure using the wireless interfaces in the storage controller and in the storage enclosure.

Another aspect hereof further provides that the storage subsystem further comprises a power supply source, and that the storage enclosure further comprises a wireless coupling to the power supply source to derive operating power therefrom.

Another aspect hereof further provides that the wireless coupling is an inductive coupling.

Another aspect hereof further provides that the storage controller further comprises: a power supply source; and a plurality of devices each having a wireless coupling to the power supply source to derive operating power therefrom.

Another aspect hereof further provides that the wireless coupling is an inductive coupling.

BRIEF DESCRIPTION OF THE DRAWINGS

FIG. 1 is a block diagram of a computing/storage enterprise using wireless interfacing in accordance with features and aspects hereof to connect computing nodes with storage enterprise components.

FIG. 2 is a block diagram of a storage subsystem in which wireless interfacing is applied in accordance with features and aspects hereof to connect storage controllers with storage enclosures.

FIG. 3 is a block diagram of a storage enclosure in which wireless interfacing is used for coupling storage devices and other components within the storage enclosure to external controlling devices and in which wireless power distribution structures are applied in accordance with features and aspects hereof.

DETAILED DESCRIPTION OF THE DRAWINGS

FIG. 1 is a block diagram depicting a variety of wireless connections between components of a storage enterprise. Nodes 120 and 122 may be any standard computing node including, for example, personal computers, workstations and server computing devices. Tape drive 102, disk drive 104 and disk arrays 106 and 108 are examples storage devices of the storage enterprise components coupled to nodes 120 and 122 for purposes of storing and retrieving information therein. As noted above, as presently known in the art, such interconnections among these storage enterprise components utilize hard-wired techniques including, for example, copper wiring or optical fiber cabling for exchanging electrical signals and/or optically encoded signals. Such electrical and optically encoded signals may comprise command, status and data signals for exchanging information between nodes 120 in 122 and the storage devices 102 through 108 in the storage enterprise.

By contrast, in accordance with features and aspects hereof, each node 120 and 122 and each storage enterprise component 102 through 108 includes a wireless interface capability to permit a wireless interconnection for the exchange of information. Coupling such computing nodes and storage enterprise components utilizing wireless interfacing techniques simplifies, and reduces costs associated with such interconnections.

Those of ordinary skill in the art will recognize that storage enterprise components 102 through 108 are merely representative of common storage devices and components. Any type of storage enterprise component may be utilized in conjunction with such wireless interconnection techniques. Examples of other storage enterprise components and storage devices include: tape library and auto changers, semiconductor memory components (e.g., flash memory and other volatile and nonvolatile memory subsystems), RAM-disks (and other semiconductor-based memory components organized to emulate disk drives or tape drives), and other RAID and non-RAID storage subsystems.

Also shown in FIG. 1 is a wireless coupling between computing nodes 120 and 122 and a storage network appliance 130. Storage area networking ("SAN") architectures provide for packet switched network connectivity between computing nodes and associated storage devices in a storage enterprise. Network appliance 130 may therefore serve as a bridge/switch/router SAN component. Through such a SAN component, computing nodes 120 and 122 may access disk arrays 132 and 134. Computing nodes 120 and 122 may utilize wireless access techniques to couple to ports of the SAN network appliance 130. In like manner, disk arrays 132 and 134 may couple to ports of SAN network appliance 130 utilizing wireless interfacing techniques.

Such a wireless SAN network appliance may be useful to serve, in essence, as a repeater such that the range of wireless connectivity between the SAN network appliance and computing nodes 120 and 122 may be kept within a specified limited range. It may be desirable to maintain some limits to the distance that may be covered between two wireless equipped components of the storage enterprise. In fact, FCC or other regulatory limits may be imposed. Further limits may be imposed by the user to secure the exchanged data from unauthorized access by users within the wireless transmission/reception distance.

To extend the distance between two storage enterprise components coupled via wireless interfaces in accordance with features and aspects hereof, it may be useful to provide a repeater device that receives wireless information from a first component and forwards the received information to another component over a distinct wireless connection. Directional antennae may be useful to isolate a first wireless connection of the repeater from a second wireless connection of the repeater. The SAN network appliance 130 may then serve as a repeater to forward information from nodes 120 and 122 to disk arrays 132 and 134 and vice versa. The wireless link from SAN network appliance 13 to nodes 120 and 122 may be kept within applicable limits and the distance between SAN network appliance 130 and disk arrays 132 and 134 may be kept within applicable limits. More specifically, network appliance 130, acting as a repeater, may be positioned intermediate between nodes 120 and 122 and disk arrays 132 and 134 such that the computing nodes and storage components may be separated by a further distance than typically permitted by the wireless interfacing.

Those of ordinary skill in the art will recognize a wide variety of equivalent topologies and configurations wherein wireless networking features and aspects hereof may be utilized for interconnection between computing nodes and associated storage devices in a storage enterprise as well as between storage networking appliances and storage enterprise components. In addition, those of ordinary skill in the art will recognize that the wireless connectivity provided by features and aspects hereof may be coupled with hard-wired connectivity for exchange of the same signals. Thus, a hard-wired interface may be provided between two components as well as a wireless interface between two components. Such redundant interface paths may aid in reducing the cost and complexity of storage component interconnection. Where multiple signal paths are desired for improved reliability through redundancy, one (or more) of the redundant paths may be a wireless connection in accordance with features and aspects hereof to reduce cost and complexity of multiple hard-wired paths without sacrificing the need for redundancy. FIG. 1 is therefore intended merely as exemplary of one possible configuration utilizing features and aspects hereof.

FIG. 2 is a block diagram of another beneficial application of features and aspects hereof. A RAID storage subsystem 200 may include within it one or more storage enclosures 202 through 206. One or more RAID controllers 220 (often housed within a separate enclosure or rack) are coupled to the storage enclosures 202 through 206 to exchange information signals therebetween. Information signals may include command, status and data signals. Each storage enclosure may include within it one or more storage devices and other ancillary devices for control and manipulation of aspects of the RAID storage subsystem 200. For example, each storage enclosure 202 through 206 may include environmental control and sensing devices as well as disk drives or other storage devices. Exemplary of such environmental control and sensing devices are power supplies, sensors for power supply failure, battery backup devices, sensors for battery backup status, temperature control devices (e.g., fans and other cooling devices), temperature sensing devices, etc. RAID controllers 220 communicate with storage enclosures 202 through 206 and with devices within each storage enclosure purposes of controlling operation of the RAID storage subsystem 200.

As noted above, as presently practiced in the art, such interconnections utilize electrical cabling or optical coupling for exchange of signals. In accordance with features and aspects hereof, RAID controller rack 220 and each storage enclosure 202 through 206 may be adapted to provide wireless interfaces for exchange of information therebetween. RAID controller rack 220 may therefore exchange information with devices within the storage enclosures 202 through 206 utilizing wireless transceivers and protocols.

Wireless signals exchanged within RAID storage subsystem 200 may be adapted for limited range transmission and reception to reduce potential interference with other wireless connections in the general vicinity and to provide a level of security regarding the broadcast of such information. In addition, as a matter of design choice, RAID storage subsystem 200 may include shielding features to help maintain the scope and range of such wireless transmissions exclusively within the confines of RAID storage subsystem 200. Those of ordinary skill in the art will recognize a variety of such design choices in the implementation of a wireless connection within the confines of a RAID storage subsystem 200. Further, those of ordinary skill in the art will recognize a wide variety of equivalent configurations for wireless connectivity among components within a RAID storage subsystem 200.

FIG. 3 is a block diagram of yet another beneficial application of wireless storage component interconnection in accordance with features and aspects hereof. A particular storage enclosure 300 may include a plurality of disk drives 302 through 306 (or any other form of storage device such as tape drives, RAM-disks, etc.). Storage enclosure 300 may also include any number of environmental monitoring and control devices 308 through 310 for control and sensing of environmental aspects of operation of storage enclosure 300.

Each of disk drives 302 through 306 and environmental components 308 through 310 may be adapted to utilize wireless interfacing as indicated by wireless transmission/reception 354. The exchange of information signals over such a wireless connection allows external control devices (e.g. such as RAID controllers described above with respect to FIG. 2) to control disk drives and environmental components within the storage enclosure 300.

In addition, each device 302 through 310 within storage enclosure 300 may include an inductive coupling 362 through 370, respectively, for wireless reception of power signals from a power source 350 within storage enclosure 300. Alternating current ("AC") power source 350 may apply alternating current to power rail 352. Each inductive coupling 362 through 370 may then inductively receive the alternating current without necessitating hardwired connectivity for such power signals. Such inductive coupling circuits, including rectifiers for converting alternating current two associated DC electrical current, are well known to those of order a skill and the art and may be selected appropriately for implementation of features and aspects hereof as a matter of design choice.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage enterprise comprising:
   a first storage enterprise component including a first wireless interface; and
   a second storage enterprise component including a second wireless interface wherein said first storage enterprise component and said second storage enterprise component exchange signals via said first wireless interface and said second wireless interface, respectively,
   wherein the exchanged signals include power signals such that the first storage enterprise component supplies power to the second storage enterprise component via the first wireless interface and the second wireless interface, respectively, and
   wherein the wireless exchange of power signals further comprises an inductive coupling to an AC power signal,
   wherein the second storage enterprise component includes a rectifier structure to generate DC power for the second storage component from the inductive coupling to the AC power signal wherein the generated DC power provides wireless power to operate the second storage enterprise component,
   wherein the storage enterprise includes among the first and second storage enterprise components a plurality of storage related components interconnected with one another and connected to one or more related workstations and server computing nodes, and
   wherein the plurality of storage related components include one or more of: individual storage devices, collections of storage devices housed within a common storage enclosure, collections of storage enclosures aggregated into a storage subsystem, storage controllers, collections of storage controllers operating cooperatively with regard to a storage devices or storage enclosures, power supplies for powering other components, and environmental components to sense and control the ambient environment.

2. The storage enterprise of claim 1 wherein information signals are exchanged between said first storage enterprise component and said second storage enterprise component via said first wireless interface and said second wireless interface, respectively.

3. The storage enterprise of claim 2
   wherein said first storage enterprise component further comprises a storage controller, and
   wherein said second storage enterprise component further comprises a storage device.

4. The storage enterprise of claim 2
   wherein said first storage enterprise component further comprises a storage controller, and
   wherein said second storage enterprise component further comprises a storage enclosure.

5. The storage enterprise of claim 2
   wherein said first storage enterprise component further comprises a storage enclosure, and
   wherein said second storage enterprise component further comprises a storage device.

6. The storage enterprise of claim 2
   wherein said first storage enterprise component further comprises a storage area network appliance, and
   wherein said second storage enterprise component further comprises a storage enclosure.

7. The storage enterprise of claim 2
   wherein said first storage enterprise component further comprises a storage area network appliance, and
   wherein said second storage enterprise component further comprises a storage device.

8. The storage enterprise of claim 2
   wherein said first storage enterprise component further comprises a computing node, and
   wherein said second storage enterprise component further comprises a storage enclosure.

9. The storage enterprise of claim 2
   wherein said first storage enterprise component further comprises a computing node, and
   wherein said second storage enterprise component further comprises a storage device.

10. The storage enterprise of claim 2
    wherein said first storage enterprise component further comprises a computing node, and
    wherein said second storage enterprise component further comprises a storage subsystem including multiple storage devices and one or more storage controllers.

11. A system comprising:
    a computing system having a wireless interface; and
    a storage subsystem having a wireless interface,
    wherein said computing system exchanges information signals with said storage subsystem using the wireless interfaces in the computing system and in the storage subsystem,
    wherein the storage subsystem further comprises a power supply source,
    wherein the storage subsystem further comprises one or more storage components within the storage subsystem that each includes a wireless coupling to the power supply source to derive operating power therefrom wherein the one or more storage components include one or more of: individual storage devices, collections of storage devices housed within a common storage enclosure, collections of storage enclosures, storage controllers, collections of storage controllers operating cooperatively with regard to a storage devices or storage enclosures, and environmental components to sense and control the ambient environment, wherein the wireless coupling to the power supply source further comprises an AC power signal, and wherein the each other component wirelessly coupled to the AC power signal includes a rectifier structure to generate DC power for therefrom wherein the generated DC power provides wireless power to operate said each other component.

12. The system of claim 11 further comprising:

a network appliance intermediate the computing system and the storage subsystem, the network appliance further comprising:

a first wireless interface wirelessly coupled to the wireless interface of the computing system; and a second wireless interface wirelessly coupled to the wireless interface of the storage subsystem, wherein the network appliance serves as a repeater to forward information signals between the computing system and the storage subsystem.

13. The system of claim 11 wherein the storage subsystem further comprises:

a storage controller having a wireless interface; and a storage enclosure having a wireless interface, wherein said storage controller exchanges information signals with said storage enclosure using the wireless interfaces in the storage controller and in the storage enclosure.

14. The system of claim 13 wherein the storage enclosure is inductively coupled to the AC power signal and includes a rectifier structure to generate DC power therefrom.

* * * * *